United States Patent Office 3,186,966
Patented June 1, 1965

3,186,966
PREPARATION OF POLYMERS CONTAINING SILICON, OXYGEN, AND ALUMINUM ATOMS
William Randall Bamford, West Kilbride, Scotland, assignor to Imperial Chemical Industries Limited, London, England, a corporation of Great Britain
No Drawing. Filed Mar. 26, 1962, Ser. No. 182,670
Claims priority, application Great Britain, Apr. 6, 1961
12,382/61
5 Claims. (Cl. 260—46.5)

The present invention relates to new and useful polymeric materials and more particularly to such materials wherein the polymeric chains are made up of recurring groups containing silicon, oxygen and aluminium atoms.

A wide variety of polymeric materials containing silicon are known and many of these are used extensively because of their valuable and advantageous properties. It has also been proposed to form polymers in which the polymeric chain contains aluminium atoms in addition to silicon and oxygen atoms. The hitherto produced polymers of this class have not in most cases had the most desirable properties and thus they have not come into general use.

An object of the present invention is to provide a process for the production of new and useful polymers containing silicon and aluminium atoms in the polymer chain. Another object is to provide such polymers which can readily be prepared by an economic and reproduceable process. Other objects will appear hereinafter.

According to the present invention these objects are accomplished by a process comprising reacting an aluminium trialkyl with a phosphinic acid and thereafter reacting the product obtained with a dihydroxyorganosilicon compound.

The alkyl groups in the aluminium trialkyl may be lower alkyl groups. Suitable groups include methyl, ethyl, n-propyl, n-butyl and isobutyl groups. All of the alkyl groups in the aluminium trialkyl may be the same or may be different. It is, however, in general preferred that all three alkyl groups should be the same and aluminium trimethyl is particularly preferred.

The two organo groups in the phosphinic acid, which may be the same or different, may be lower alkyl groups or phenyl groups. Suitable groups which may be present include methyl, ethyl, n-propyl, isopropyl and phenyl groups.

The dihydroxyorganosilicon compound may be a silanediol, a bis(hydroxydiorganosilyl)benzene or a tetraorganodisiloxane-1,3-diol. Suitable compounds include, for example, diethylsilanediol, diphenylsilanediol, methylphenylsilanediol, 1,4 - bis(hydroxydimethylsilyl)benzene, tetraphenyldisiloxane-1,3-diol, tetramethyldisiloxane-1,3-diol, 1,3-dimethyl-1,3-diphenyldisiloxane-1,3-diol and the like.

The phosphinoxyaluminium dialkyl prepared in the first stage of the reaction may, if desired, be separated from the reaction mixture in which it is prepared. In general, however, this is unnecessary and the second stage of the reaction may be carried out without this intervening separation.

While polymeric products can be obtained by reacting the three reactants in various proportions it is preferred that they should be used in substantially stoichiometric proportions as this gives substantially linear polymers which are in general the most desirable. If the phosphinic acid is used in excess of the amount required to displace one alkyl group from the aluminium trialkyl the polymers obtained will be of low molecular weight while if the phosphinic acid is used in insufficient quantity it will be necessary to use a greater proportion of the dihydroxyorganosilicon compound and the polymer obtained thereby will be cross-linked in some measure.

It is normally preferred to carry out the reaction in the presence of a solvent which is subsequently removed by distillation. Any inert organic solvent which is liquid at the temperature of reaction may be used. Suitable solvents include, for example, hydrocarbons and ethers such as benzene, toluene, xylene, methylcyclohexane, tetrahydrofuran, diethyl ether and the like.

The first stage of the reaction is normally carried out at temperatures of the order of 10–40° C. Higher temperatures may be used if desired but no advantage is obtained thereby. Completion of the first stage of the reaction is indicated by the theoretical quantity of the liberated hydrocarbon having been evolved. The second stage is carried out at temperatures similar to those used in the first stage. It is however, generally preferred to complete the reaction by slight heating to a temperature of the order of 65° C. It is also normally preferred to carry out the reaction at atmospheric pressure and it is also necessary that an inert atmosphere, for example of nitrogen, be provided. In the absence of an inert atmosphere difficulties are caused by the tendency of the alkyl aluminium compounds to oxidise and ignite.

Our invention is further illustrated by the following examples in which all parts are by weight.

*Example 1*

A suspension of 123 parts of dimethylphosphinic acid in 2000 parts of dry benzene was added to a solution of 94 parts of trimethylaluminium in 1000 parts of methylcyclohexane. When the evolution of methane had subsided 157 parts of diethylsilanediol dissolved in 800 parts of dry tetrahydrofuran were added while mixing. The mixture was warmed to 60° C. to complete the reaction, and the solvents removed by evaporation. There was thus obtained 310 parts of a polymer consisting of a white powder melting at about 280° C. This polymer when mixed with asbestos and further heated gave a hard infusible mass suitable for use as a high temperature insulator and in gaskets.

*Example 2*

A boiling solution of 285 parts of diphenylphosphinic acid in 800 parts of toluene was added to a solution of 94 parts of trimethylaluminium in 1000 parts of methylcyclohexane and 292 parts of 1,4-bis(hydroxydimethylsilyl)benzene in 3000 parts of dry ether added thereto. When the evolution of gas had ceased the solvents were removed by evaporation. There was thus obtained 580 parts of a polymer consisting of a hard white solid of melting point 400–410° C. This polymer was of value as a filler for synthetic resin moulding compositions required to withstand high temperatures.

*Example 3*

The process of Example 1 was repeated except that the dimethylphosphinic acid was replaced by 285 parts of diphenylphosphinic acid. There was thus obtained 470 parts of a polymer which consisted of a white powder which softened at 430–450° C. and was of value as an electrical potting composition.

*Example 4*

The process of Example 1 was repeated except that the diethylsilanediol was replaced by 542 parts of tetraphenyldisiloxane-1,3-diol dissolved in 800 parts of dry benzene. There was thus obtained 690 parts of a polymer in the form of a white powder which softened at 170–190° C. This product was capable of being formed into hard thermoplastic films. When mixed with asbestos and heated to 320° C. a thermosetting composition suitable for use in temperature resistant insulators and gaskets was obtained.

*Example 5*

The process of Example 2 was repeated except that 1,4-bis(hydroxydimethylsilyl)benzene in ether was replaced by 295 parts of diphenylsilanediol in 1600 parts of toluene. There was thus obtained 603 parts of an infusible white powder. This polymer was of value as a heat resistant filler in moulding compositions.

What I claim is:

1. A process for the production of a polymer having polymeric chains made up of recurring groups containing silicon, oxygen and aluminum atoms, said process comprising providing a quantity of an aluminum trialkyl, reacting said aluminum trialkyl with a phosphinic acid selected from the group consisting of lower alkyl phosphinic acids and phenylphosphinic acids to obtain an intermediate product, and thereafter reacting said intermediate product with a dihydroxyorganosilicon compound selected from the group consisting of lower alkyl silanediols, monocyclic aryl silanediols, lower alkyl-monocyclic aryl silanediols, bis(hydroxy lower alkylsilyl) benzenes, tetramonocyclic aryl disiloxane-1,3-diols, tetra lower alkyl disiloxane-1,3-diols, and tetra lower alkyl, monocyclic aryl disiloxane-1,3-diols to obtain said polymer, said process being carried out in the presence of an inert organic solvent and at a temperature of reaction such that said solvent remains liquid throughout.

2. A process as claimed in claim 1 wherein the alkyl groups in the aluminum trialkyl are selected from the group consisting of methyl, ethyl, n-propyl, n-butyl and isobutyl groups.

3. A process as claimed in claim 2 wherein the aluminium trialkyl is aluminium trimethyl.

4. A process as claimed in claim 1 wherein the reaction is carried out in presence of a solvent selected from the group consisting of benzene, toluene, xylene, methylcyclohexane, tetrahydrofuran and diethyl ether.

5. The polymer obtained by the process of claim 1.

References Cited by the Examiner

UNITED STATES PATENTS 2,488,449  11/49  Trautman _____ 260—46.5
3,061,587  10/62  Rust et al. _____ 260—2

FOREIGN PATENTS 933,191  8/63  Great Britain.

OTHER REFERENCES

Andrianov et al.: Vol. 42, Rubber Abstracts, Nov. 1, 1964, page 43.

LEON J. BERCOVITZ, *Primary Examiner.*

LOUISE P. QUAST, MURRAY TILLMAN, *Examiners.*